US005797590A

United States Patent [19]

Börner et al.

[11] Patent Number: 5,797,590

[45] Date of Patent: Aug. 25, 1998

[54] PISTON VALVE

[75] Inventors: Gunter Börner, Mülhausen; Jörg Sopka, Schwetzingen, both of Germany

[73] Assignee: ABB Research Ltd., Zurich, Switzerland

[21] Appl. No.: 861,856

[22] Filed: May 22, 1997

[30] Foreign Application Priority Data

May 24, 1996 [DE] Germany ........................ 196 20 949.8

[51] Int. Cl.$^6$ ........................ F16K 3/24

[52] U.S. Cl. ........................ 251/324; 137/560

[58] Field of Search ........................ 251/318, 324; 137/560

[56] References Cited

U.S. PATENT DOCUMENTS 3,955,796 5/1976 Grove ........................ 251/324 X
5,201,493 4/1993 Kim ........................ 137/560 X

*Primary Examiner*—John Fox

*Attorney, Agent, or Firm*—Herbert L. Lerner; Laurence A. Greenberg

[57] ABSTRACT

A piston valve for liquids provides potential isolation between an inlet-side and an outlet-side liquid. The piston valve is suitable, in particular, for controlling water-based paints in painting appliances which operate by electrostatic charging. At least one control electrode which is at the electric potential of the liquid present at the outlet of the valve is provided in order to improve the service life of the valve.

16 Claims, 1 Drawing Sheet

PISTON VALVE

BACKGROUND OF THE INVENTION

Field of the Invention

The invention relates to a piston valve providing potential isolation between liquids having different electrical potentials on inlet and outlet sides and controlling a throughflow of an electrically conductive liquid, including a cylinder, a piston located in the cylinder, a seal between the cylinder and the piston, and electrical insulation insulating a liquid inlet from a liquid outlet so that a liquid at earth or ground potential is isolated in terms of potential from a liquid at high-voltage potential, with the valve closed.

Such a piston valve as well as a typical use therefor are known from Published International Patent Application WO 93/23173. That valve can be employed for controlling electrically conductive liquids, such as, for example, water-based paints which are sprayed through the use of electrostatic charging. Potential differences of about 100 kV direct voltage may occur between the valve inlet and the valve outlet.

The testing of such valves has shown that the potential differences occurring during operation result in high electric field strengths which lead, in turn, to "electrical aging" of the materials used in the valves. That results in insufficient service lives of the valves, particularly with regard to use for the standard electrostatic painting of motor vehicles.

SUMMARY OF THE INVENTION

It is accordingly an object of the invention to provide a piston valve that is suitable for liquids and has potential isolation, which overcomes the hereinafore-mentioned disadvantages of the heretofore-known devices of this general type and which has a longer service life.

With the foregoing and other objects in view there is provided, in accordance with the invention, a piston valve for controlling throughflow of an electrically conductive liquid, comprising a cylinder having an extension; a piston; a seal between the cylinder and the piston; a liquid inlet and a liquid outlet; electrical insulation insulating the liquid inlet from the liquid outlet for isolating a liquid at earth potential from a liquid at high-voltage potential in terms of potential, in a closed valve position; and at least one control electrode disposed at the extension for carrying the same electric potential as a liquid at the liquid outlet.

In accordance with another feature of the invention, the extension carries liquid, the cylinder and the extension are formed of a ceramic or a glass, and the control electrode is fused into the extension and is in contact with the liquid within the extension.

In accordance with a further feature of the invention, the extension is formed of a metal and the control electrode is shaped onto the extension.

In accordance with an added feature of the invention, the cylinder is electrically insulating, and the metallic extension is adhesively bonded or fused to the cylinder.

In accordance with an additional feature of the invention, the cylinder, the extension and the electrode form a configuration, and there is provided an electrically insulating material encasing the configuration.

In accordance with yet another feature of the invention, there is provided a housing into which the configuration is inserted. If the electrically insulating material is a liquid, a liquid-tight housing is provided.

In accordance with yet a further feature of the invention, there is provided a further extension adjoining the extension with the control electrode and produced from the same material as the extension, and a first additional control electrode disposed on the further extension and carrying the potential of the liquid at the outlet.

In accordance with yet an added feature of the invention, there is provided an inlet region upstream of the liquid inlet, and a second additional control electrode disposed in the inlet region and carrying earth potential.

In accordance with yet an additional feature of the invention, there is provided an additional electrically insulating liquid disposed between the piston and the cylinder.

In accordance with again another feature of the invention, the electrodes are produced from a metal or an electrically conductive plastic.

In accordance with a concomitant feature of the invention, the electrodes have a radii of curvature of at least three millimeters.

The proposed structure of the piston valve, that is to say the provision of at least one control electrode which is at the outlet-side liquid potential, achieves a lowering of the field strength, which leads to a marked improvement in durability of the valve materials. Through the use of suitably shaped control electrodes, an electric field strength in the valve body of less than 20 kV/mm can be achieved in the case of potential differences of up to 200 kV. The desired reduction in field strength can be adjusted by a suitable electrode structure and by additional electrodes.

Other features which are considered as characteristic for the invention are set forth in the appended claims.

Although the invention is illustrated and described herein as embodied in a piston valve, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
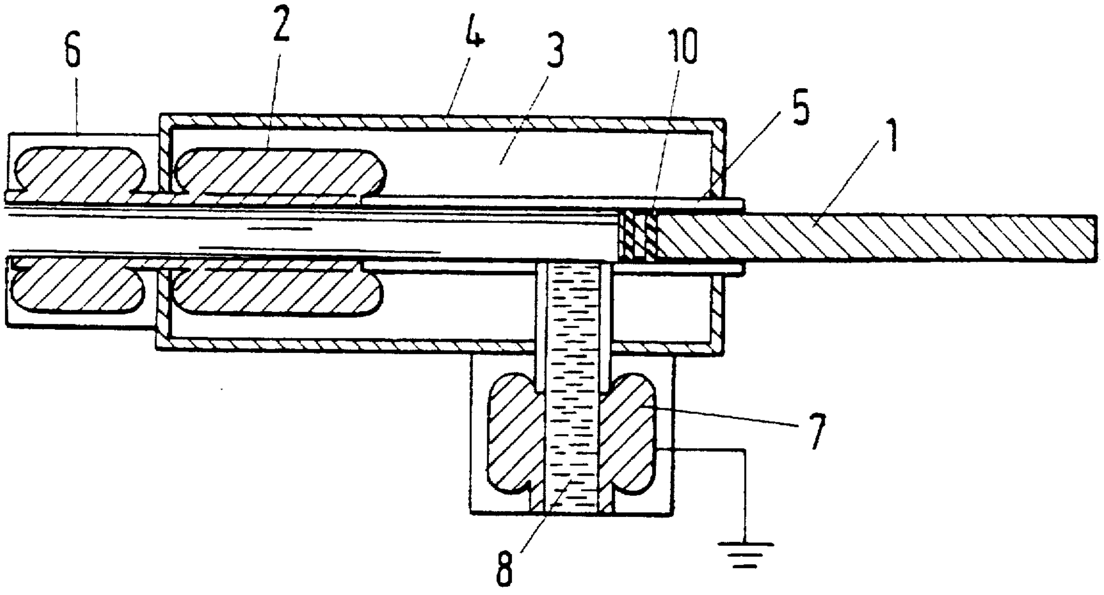
FIG. 1 is a diagrammatic, sectional view of a valve in an opened state.
Figure 2:
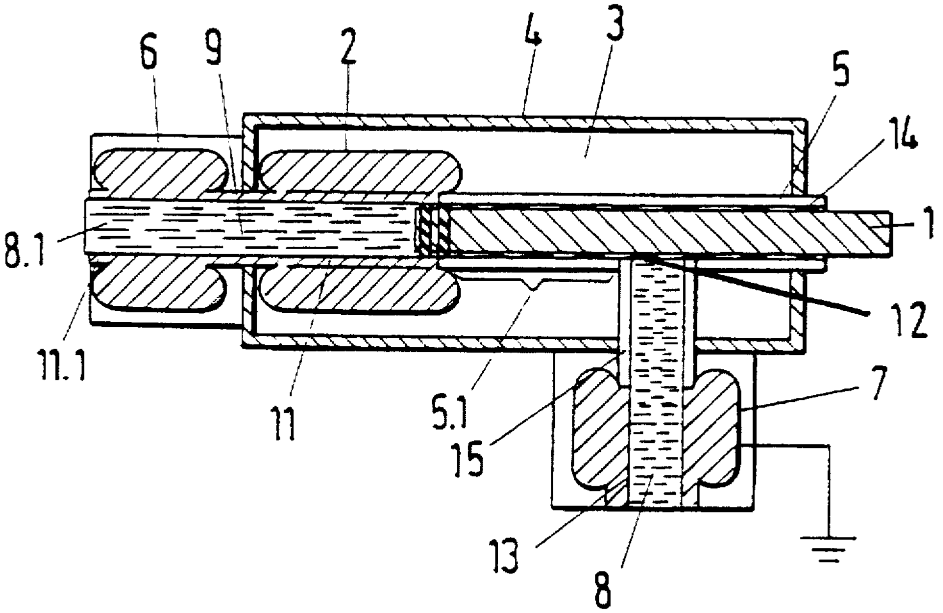
FIG. 2 is a view similar to FIG. 1 showing a valve in a closed state.

Referring now in detail to FIGS. 1 and 2 of the drawings which show a diagrammatic representation of a preferred valve structure, there is seen a valve piston 1 which is produced from an electrically insulating material and is movably disposed within a cylinder 5 that is likewise formed of an electrically insulating material. Suitable materials for the electrically insulating cylinder 5 are ceramics and, in particular, glasses, for example borosilicate glasses. The piston has a head region which is provided with a seal in the form of sealing rings 10.

In order to close or open the valve, the piston 1 is displaced in the cylinder 5 through the use of a non-illustrated pneumatic, hydraulic or electric drive with the result that a liquid inlet 12 is exposed as is illustrated in FIG. 1, or is closed as is illustrated in FIG. 2.

In the closed state shown in FIG. 2, a cylinder part 5.1 is located between the head region of the piston 1 and the liquid inlet 12. The cylinder part 5.1 ensures electrical insulation between an inlet-side liquid 8, which is at earth or ground potential, and an outlet-side liquid 8.1, which is at high-voltage potential.

In order to increase breakdown strength, an additional insulating liquid 14 may also be additionally forced into an interspace between the valve piston 1 and the cylinder 5. This additional insulating liquid 14 should be selected specifically according to the media being used, since it contaminates the liquid 8 controlled by the valve. If the controlled liquid 8 is water-based paint, paraffin oil is appropriate as an additional insulating liquid 14.

A control electrode 2 is disposed on an extension 11 of the cylinder 5. In the illustrated example, the extension 11 is produced from metal. However, this extension may also be produced from the electrically insulating material of the cylinder 5, instead of from metal. In the case of a metallic extension 11, the metal should be chemically resistant to the medium, for example water-based paint. A suitable material for the extension 11 is steel. The metallic extension 11 may be connected to the electrically insulating cylinder 5 by adhesive bonding or fusion, for example, with a connection point being smoothed on the inside in such a way that the valve piston 1 can slide over the connection point.

The illustrated metallic extension 11 is shaped to form the control electrode 2, so that an electrical connection is made between the control electrode 2 and the liquid 8.1 located at an outlet 9. If the extension is not produced from metal, but from electrically insulating material, for example glass, the control electrode 2 is attached and fused in, in such a way that an electrical connection is likewise made between the liquid 8.1 and the electrode 2. An electrode shape having a radius of curvature which amounts to at least three millimeters, is particularly suitable. The control electrode 2 is therefore always at the potential of the outlet-side liquid 8.1 and brings about a lowering of the field strength at the valve.

Electrical insulation relative to the outside, that is to say relative to the environment, may be achieved by encasing the valve configuration in an electrical insulation 3, for example polyethylene. If a liquid insulation, for example an oil, is used, a corresponding leakproof housing 4 around the insulation 3 is necessary.

As is illustrated in the drawing figures, additional electrodes 6, 7 may also be provided for the purpose of further lowering the field strength. A first additional electrode 6 is disposed on a further extension 11.1. The description of the extension 11 and the electrode 2 given above accordingly applies both to the further extension 11.1 and the first additional electrode 6 with regard to material, structure and potential.

A second additional electrode 7, which is at earth or ground potential, is disposed on a supply lead 15 in an inlet region 13 connected upstream of the liquid inlet 12.

We claim:

1. A piston valve for controlling throughflow of an electrically conductive liquid, comprising:

a cylinder having an extension;

a piston movable in said cylinder between an open and a closed position;

a seal between said cylinder and said piston;

a liquid inlet and a liquid outlet;

electrical insulation insulating said liquid inlet from said liquid outlet for isolating a liquid at earth potential from a liquid at high-voltage potential in terms of potential, in said closed position; and at least one control electrode disposed at said extension for carrying the same electric potential as a liquid at said liquid outlet.

2. The piston valve according to claim 1, wherein said extension carries liquid, said cylinder and said extension are formed of a material selected from the group consisting of a ceramic and a glass, and said control electrode is fused into said extension and is in contact with the liquid within said extension.

3. The piston valve according to claim 1, wherein said extension is formed of a metal and said control electrode is shaped onto said extension.

4. The piston valve according to claim 3, wherein said cylinder is electrically insulating, and said metallic extension is adhesively bonded to said cylinder.

5. The piston valve according to claim 3, wherein said cylinder is electrically insulating, and said metallic extension is fused to said cylinder.

6. The piston valve according to claim 1, wherein said cylinder, said extension and said electrode form a configuration, and including an electrically insulating material encasing said configuration.

7. The piston valve according to claim 6, including a housing into which said configuration is inserted.

8. The piston valve according to claim 6, wherein said electrically insulating material is a liquid, and including a liquid-tight housing into which said configuration is inserted.

9. The piston valve according to claim 1, including a further extension adjoining said extension with said control electrode and produced from the same material as said extension, and an additional control electrode disposed on said further extension and carrying the potential of the liquid at said outlet.

10. The piston valve according to claim 1, including an inlet region upstream of said liquid inlet, and an additional control electrode disposed in said inlet region and carrying earth potential.

11. The piston valve according to claim 1, including a further extension adjoining said extension with said control electrode and produced from the same material as said extension, a first additional control electrode disposed on said further extension and carrying the potential of the liquid at said outlet, an inlet region upstream of said liquid inlet, and a second additional control electrode disposed in said inlet region and carrying earth potential.

12. The piston valve according to claim 1, including an additional electrically insulating liquid disposed between said piston and said cylinder.

13. The piston valve according to claim 1, wherein said electrodes are produced from an electrically conductive material selected from the group consisting of a metal and an electrically conductive plastic.

14. The piston valve according to claim 1, wherein said electrode has a radii of curvature of at least three millimeters.

15. The piston valve according to claim 9, wherein said electrode has a radii of curvature of at least three millimeters.

16. The piston valve according to claim 10, wherein said electrode has a radii of curvature of at least three millimeters.

* * * * *

UNITED STATES PATENT AND TRADEMARK OFFICE
CERTIFICATE OF CORRECTION

PATENT NO. : 5,797,590
DATED : August 25, 1998
INVENTOR(S) : Gunter Borner et al.

It is certified that error appears in the above-identified patent and that said Letters Patent is hereby corrected as shown below:

TITLE PAGE:
Item [30] should read as follows:

May 22, 1996 [DE] Germany ..... 196 20 577.8

Signed and Sealed this

Twenty-second Day of December, 1998

Attest:

BRUCE LEHMAN

*Attesting Officer* *Commissioner of Patents and Trademarks*